(12) United States Patent
Krefft et al.

(10) Patent No.: US 12,259,478 B2
(45) Date of Patent: Mar. 25, 2025

(54) INJECTING AN ARBITRARY IQ STREAM INTO A TEST ENVIRONMENT

(71) Applicant: Spirent Communications, PLC, Crawley (GB)

(72) Inventors: Felix Michael Krefft, Paignton (GB); Stephen Nigel Beales, Paignton (GB); Mark Geoffrey Holbrow, Paignton (GB)

(73) Assignee: Spirent Communications, PLC, Crawley (GB)

( * ) Notice: Subject to any disclaimer, the term of this patent is extended or adjusted under 35 U.S.C. 154(b) by 246 days.

(21) Appl. No.: 17/733,770

(22) Filed: Apr. 29, 2022

(65) Prior Publication Data

US 2023/0350072 A1 Nov. 2, 2023

(51) Int. Cl.
*G01S 19/01* (2010.01)
*G01S 19/02* (2010.01)
(Continued)

(52) U.S. Cl.
CPC ............ *G01S 19/015* (2013.01); *G01S 19/02* (2013.01); *G01S 19/23* (2013.01); *G01S 19/254* (2013.01); *G01S 19/51* (2013.01)

(58) Field of Classification Search
CPC ........ G01S 19/015; G01S 19/02; G01S 19/23; G01S 19/254; G01S 19/51
See application file for complete search history.

(56) References Cited

U.S. PATENT DOCUMENTS 6,549,051 B1 * 4/2003 Di Veroli ........... H03H 17/0009
327/158
8,384,593 B2 2/2013 Levola et al.
(Continued)

FOREIGN PATENT DOCUMENTS

CN 109613569 A 4/2019
CN 110515050 B 8/2021
(Continued)

OTHER PUBLICATIONS

GB2208972.6—Search Report dated Dec. 6, 2022, 3 pages.
(Continued)

*Primary Examiner* — Vladimir Magloire
*Assistant Examiner* — Noah Yi Min Zhu
(74) *Attorney, Agent, or Firm* — Haynes Beffel & Wolfeld LLP; Ernest J. Beffel, Jr.

(57) ABSTRACT

Disclosed is incorporating an IQ stream into a test signal for a receiver in motion, configuring a path for the motion of the receiver during simulation, a period of the simulation, a transmitter constellation to emulate, and a path of at least one IQ stream transmitter. Also generating signals emulating the transmitter constellation and conditioning the stream to be merged with the signals, using distance and relative motion between receiver and transmitter to determine delay and Doppler shift between transmitter and receiver in motion, scheduling sampling of the signal, including interpolation among samples of the stream, based on delay and Doppler shift, and synthesizing a conditioned stream from the interpolation between the samples, taking into account signal level of the stream, in addition to delay and shift, and merging the conditioned signal with the signals emulating the transmitter constellation and supplying the merged signals to the receiver during the test.

23 Claims, 13 Drawing Sheets

(51) Int. Cl.
*G01S 19/23* (2010.01)
*G01S 19/25* (2010.01)
*G01S 19/51* (2010.01)

(56) References Cited

U.S. PATENT DOCUMENTS

| | | | |
|---|---|---|---|
| 8,934,384 B2 | 1/2015 | Gunawardena et al. | |
| 10,574,437 B1 | 2/2020 | Ye et al. | |
| 2014/0225773 A1* | 8/2014 | Boulton | B64G 1/1085 342/357.62 |
| 2016/0050034 A1* | 2/2016 | Pearse | H04B 17/21 455/67.14 |
| 2018/0188379 A1* | 7/2018 | Whitworth | G01S 19/21 |
| 2020/0371250 A1* | 11/2020 | Filarsky | G06F 30/20 |
| 2021/0096265 A1* | 4/2021 | Ilie | G01S 19/23 |
| 2022/0066049 A1* | 3/2022 | Krefft | G01S 19/03 |
| 2022/0095114 A1 | 3/2022 | Bishop et al. | |
| 2023/0140048 A1* | 5/2023 | Zangvil | G01S 19/03 342/464 |

FOREIGN PATENT DOCUMENTS

| | | |
|---|---|---|
| EP | 3798682 A1 | 3/2021 |
| WO | 2021041447 A1 | 3/2021 |
| WO | 2021045976 A1 | 3/2021 |

OTHER PUBLICATIONS

Ilg, Mark, Framework for a Software-defined Global Positioning System (GPS) Receiver for Precision Munitions Applications, Army Research Laboratory, dated Apr. 2012, 34 pages.
Bartunkova et al., Broadband Multi-Frequency GNSS Signal Simulation with Gpu, IEEE, dated 2016, 14 pages.
Spirent, Spirent GSS7000, Flexible and Powerful Multi-GNSS Constellation Simulator System, dated 2020, 4 pages.
Spirent, How Should the Automotive Industry Test V2X Systems, White Paper, dated 2018, 12 pages.
Anonymous, An Introduction to GNSS—Chapter 6—GNSS + INSS, NovAtel, retrieved on Sep. 24, 2018, 3 pages. Retrieved from the internet [URL: https://www.novatel.com/an-introduction-to-gnss/chapter-6-gnss-ins/gnss-ins-systems/ ].
Spirent, Spirent GSS6700, Flexible Multi-GNSS Constellation Simulator System, dated 2015, 4 pages.
Bartunková, Parallel Software Architecture and Algorithms for GNSS Signal Simulation (dissertation), Jun. 10, 2016, Universität der Bundeswehr München, 138 pgs (https://athene-forschung.unibw.de/doc/121215/121215 .pdf).
Generation of GNSS Signals in a Hardware in the Loop (HIL) Environment, Application Note, Version 1GP102_3E, Rohde & Schwarz GmbH & Co. KG, 2020, 40 pages (http://www.rohde-schwarz.com/appnote/1GP102).
GB—2015482.9, Search Report dated May 26, 2022, 3 pages.
Wang, et al "Acceleration Method for Software Signal Simulators of BDS Navigation Signals and RDSS Signals Based on Gpgpu," IEEE Access, vol. 7, Jun. 2019, pp. 102843-102851.
Wei et al, Chap 25, "General Computing Platform Based GNSS Signal Simulator Architecture: Design, Implementation and Validation", China Satellite Navigation Conference (CSNC) Apr. 2014 Proceedings: vol. I (Lecture Notes in Electrical Engineering 303), (J. Sun et al. (eds.)), pp. 279-294 (DOI: 10.1007/978-3-642-54737-9_25, Springer-Verlag Berlin Heidelberg 2014).
Li et al, Chap 35, "A CUDA-Based Real-Time Software GNSS IF Signal Simulator", China Satellite Navigation Conference (CSNC) 2012 Proceedings, Lecture Notes in Electrical Engineering 161, J. Sun et al. (eds.), pp. 359-369. (DOI: 10.1007/978-3-642-29193-7_35, Springer-Verlag Berlin Heidelberg 2012).
Bartunkova, et al , Massive Parallel Algorithms for Software GNSS Signal Simulation using GPU, 25th International Meeting of the Satellite Division off the Institute of Navigation, Nashville, TN, Sep. 17-23, 2012, pp. 119-126.
U.S. Appl. No. 17/024,533, filed Sep. 17, 2020, U.S. Pat. No. 11,536,851, Dec. 27, 2022, Issued.
U.S. Appl. No. 18/088,426, filed Dec. 23, 2022, 20230350076, Nov. 2, 2023, Pending.
2015482.9, Sep. 30, 2020, 2598407, Mar. 2, 2022, Pending.
2208972.6, Jun. 17, 2022, 2618392, Nov. 8, 2023, Pending.
GB2015482.9, Search Report dated May 26, 2021, 3 pages.
GB2015482.9—First Examination Report dated May 1, 2024, 4 pages.
GB2015482.9—Notice of Intention to Grant dated Aug. 5, 2024, 2 pages.

\* cited by examiner

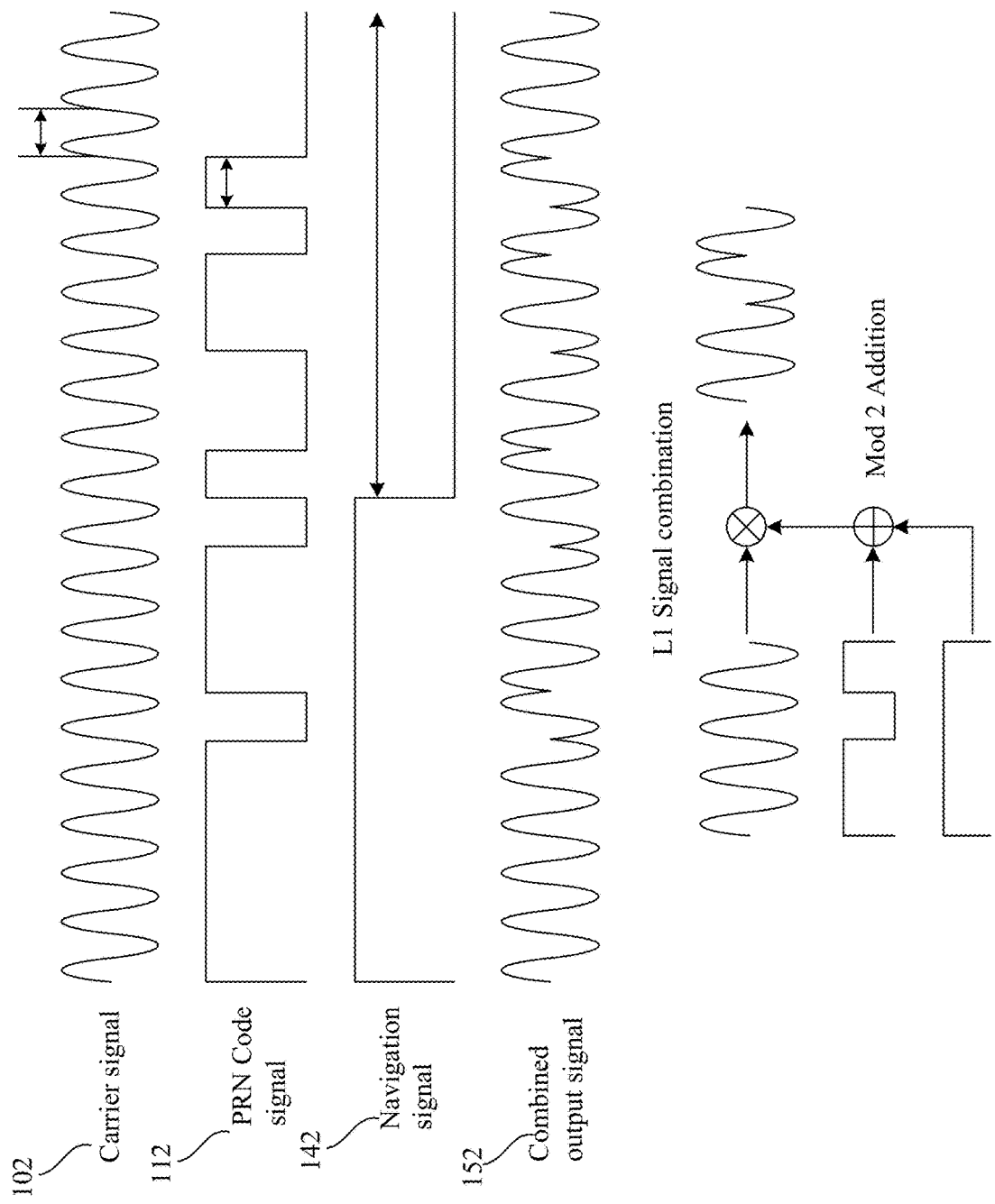
FIG. 1A – Signal Illustration

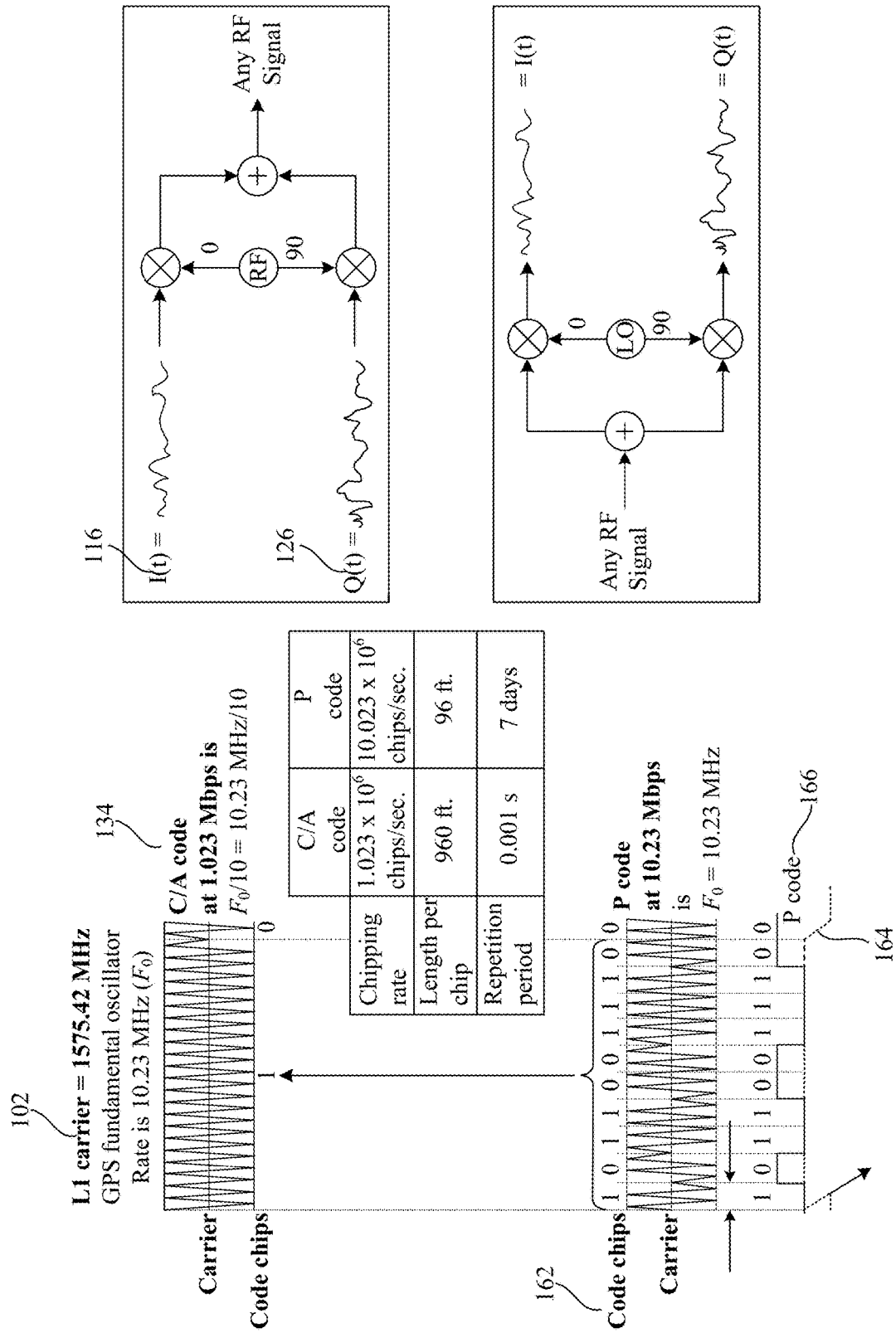
FIG. 1B - Signal Illustration

INJECTING AN ARBITRARY IQ STREAM INTO A TEST ENVIRONMENT

INCORPORATIONS

The following application is incorporated by reference for all purposes as if fully set forth herein: U.S. application Ser. No. 17/024,533, titled Highly Scalable, Low Latency, GPU Based GNSS Simulation, filed 17 Sep. 2020.

FIELD OF THE TECHNOLOGY DISCLOSED

The technology disclosed relates generally to Global Navigation Satellite Systems (GNSS) and more specifically to harnessing general processing units (GPUs) to synthesize GNSS encoded signals. The technology also applies to incorporating quadrature signals of an IQ stream into a test signal used to test a receiver in motion. The disclosed technology further relates to using field programmable gate arrays (FPGAs) to synthesize quadrature signals of an IQ stream into a test signal. The disclosed technology also relates to harnessing GPUs and FPGAs to synthesize encoded cellular signals and Wi-Fi signals.

BACKGROUND

The following detailed description is made with reference to the figures. Sample implementations are described to illustrate the technology disclosed, not to limit its scope, which is defined by the claims. Those of ordinary skill in the art will recognize a variety of equivalent variations on the description that follows. The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Anti jamming and anti-spoofing capabilities are becoming essential features of mission-critical GNSS receivers and dependent systems, as threats from signal jamming and spoofing are increasing; both from civilian sources (e.g., illegal personal privacy devices (PPDs) intended to mask a commercial vehicle's whereabouts) and from the use of radio frequency interference (RFI) as an electronic warfare (EW) method deployed by nation states to disrupt an adversary's operations. Incidences of real-world GNSS jamming and spoofing continue to increase in number, magnitude of impact and sophistication; a trend that is likely to continue as the equipment needed to build powerful jammers and spoofers becomes progressively cheaper and more powerful. The International Civil Aviation Organization (ICAO) received 174 reports of GPS disruption in the Eastern Mediterranean region in 2018, compared to just 32 between 2015 and June 2018.

In the military domain, the need to protect mission-critical position, navigation and timing (PNT) systems led to the development of adaptive antennas that can be retro-fitted to a wide range of GPS receivers. Now, adaptive antennas are also increasingly used in commercial applications such as surveying, mining and autonomous vehicles. These adaptive antenna systems need to be thoroughly tested, particularly if they are to be used in safety and liability-critical contexts.

Global navigation satellite system (GNSS) is used in this discussion to refer collectively to global and regional satellite systems that broadcast signals used to fix locations, both on the surface of the Earth and in the atmosphere. The familiar US GPS satellite system uses one set of signals/codes, some available for general use and others for restricted, government or military use. Russia has GLO-NAS. Europe and China also have satellite constellations that are or soon will be global. Regional satellites over Japan and India, for instance, also are available. There is enough similarity among this range of GNSS systems that a single test apparatus can simulate signals from whichever satellites a receiver can process. The more sophisticated the receiver, the more constellations it handles and the more elaborate the test apparatus must be, both because more signal sources (satellites) are visible at one time and because multiple encoding systems are used by the various constellations.

Encoding and decoding positioning signals from GNSS satellites is a precise, demanding task, especially when coupled to a vehicle motion simulator. Both relativistic and Doppler effects of satellite motion need to be taken into account in order for location-enabled devices to triangulate terrestrial positions within three or six feet accuracy, based on signals originating tens of thousands of miles away. A vehicle motion simulator delivers current vehicle trajectory as the simulation proceeds, which reduces pre-calculation options.

The authorized use by 5G operators of frequencies adjacent to the GNSS bands means that adjacent band interference (ABI) is also likely to become an important part of the threat landscape. While older, high-precision GNSS receivers will be most significantly affected, ABI is still likely to present a challenge for some critical safety-of-life applications.

Some GNSS signals have a bandwidth of more than 90 MHz and require sample rates of up to 120 Msps in the signal generation. This complex encoding is handled on satellites by special purpose application-specific integrated circuits (ASICs). In simulators, signals are digitally synthesized by deep pipelines on field programmable gate arrays (FPGAs). However, FPGAs are expensive and relatively difficult to program. Also, features to be simulated are limited by the existing capabilities of FPGAs.

Some users need to be able to provide an IQ signal stream for receiver testing, so signal generation based on a specific IQ signal stream in digital baseband is desired for running simulations.

An opportunity arises for using an IQ signal file as input for generating an IQ signal stream that includes the modulation associated with the signal stream. The disclosed technology can utilize the disclosed generated IQ signal stream in a simulation to test GNSS, Wi-Fi and 5G receivers in motion.

SUMMARY

The technology disclosed addresses incorporating an IQ stream with a start time into a test signal used to test a receiver in motion. The method begins at configuring the test, including configuring a path for the motion of the receiver during the simulation, configuring a period of the simulation that includes time corresponding to the start time, configuring at least one satellite transmitter constellation to emulate during the simulation, and configuring a location of or path for the motion of at least one IQ stream transmitter during the simulation. The method also includes generating signals emulating the transmitter constellation, conditioning the IQ stream to be merged with the signals emulating the transmitter constellation, including using distance and relative motion between the receiver and the IQ stream transmitter to determine delay and Doppler frequency shift between the IQ stream transmitter and the receiver in motion. The method further includes scheduling sampling of the IQ signal, including interpolation among samples of the IQ stream, taking into account the delay and the Doppler frequency shift, and synthesizing a conditioned IQ stream from the interpolation among the samples, further taking into account signal level of the conditioned IQ stream, in addition to the delay and the Doppler frequency shift. The disclosed technology also includes merging the conditioned IQ signal with the signals emulating the transmitter constellation, and supplying the merged signals to the receiver during the test.

For some scenarios, the disclosed technology includes specifying a constellation of IQ stream transmitters, with different locations/trajectories and IQ files to transmit. The receiver can then see the combined RF from the constellation of transmitters with the individual motion effects applied before the combination of the different signal sources.

Particular aspects of the technology disclosed are described in the claims, specification and drawings.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1A illustrates background information for GPS L1 C/A signal structure, with a carrier signal, a PRN code signal and Navigation data stream, and shows a combined, spread spectrum output signal containing carrier, PRN and navigation signal.

FIG. 1B illustrates the relationship between the L1 carrier and the code chips on the left and the relation between baseband IQ data and the RF signal on the right.

Figure 11A:
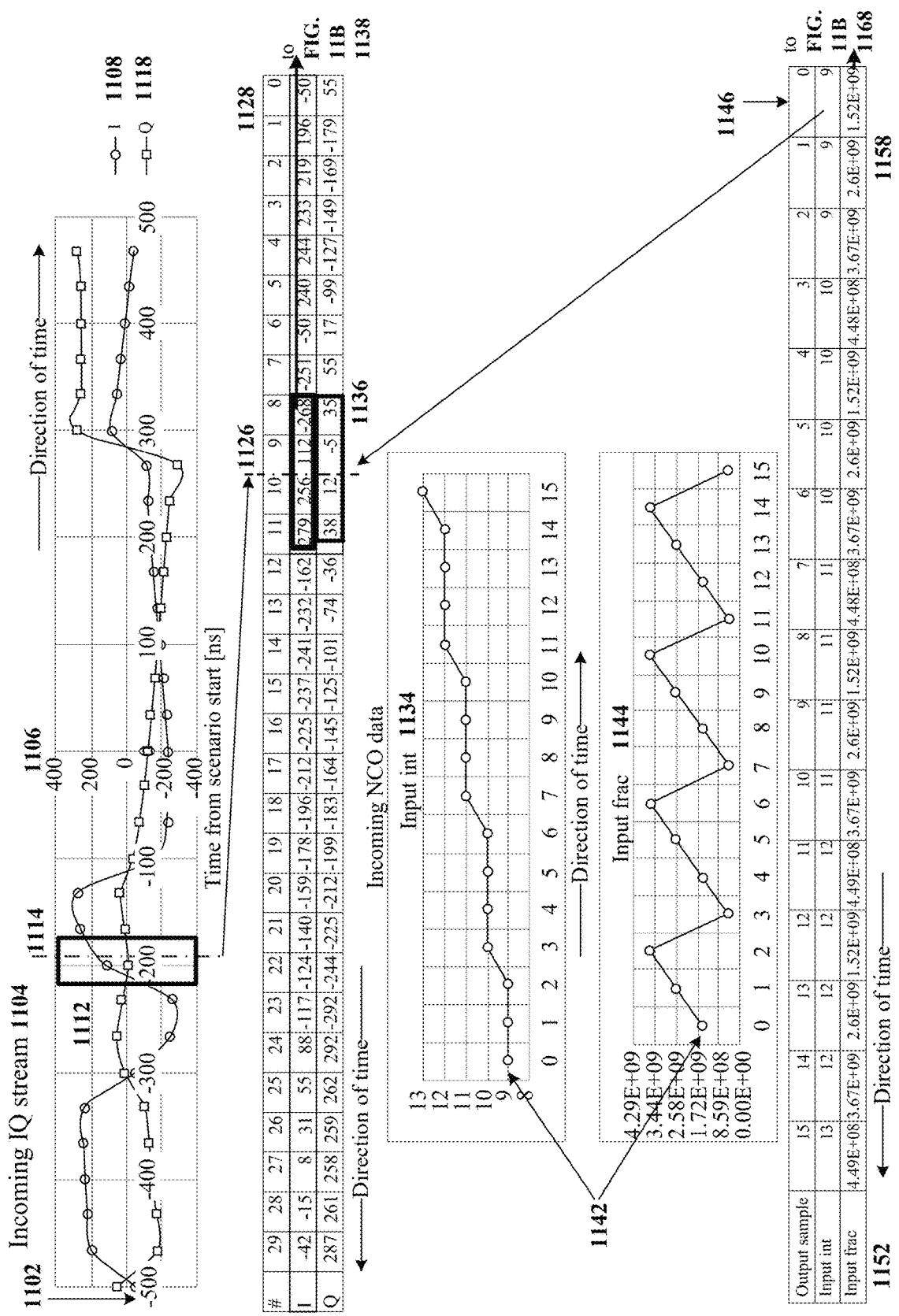
Figure 11B:
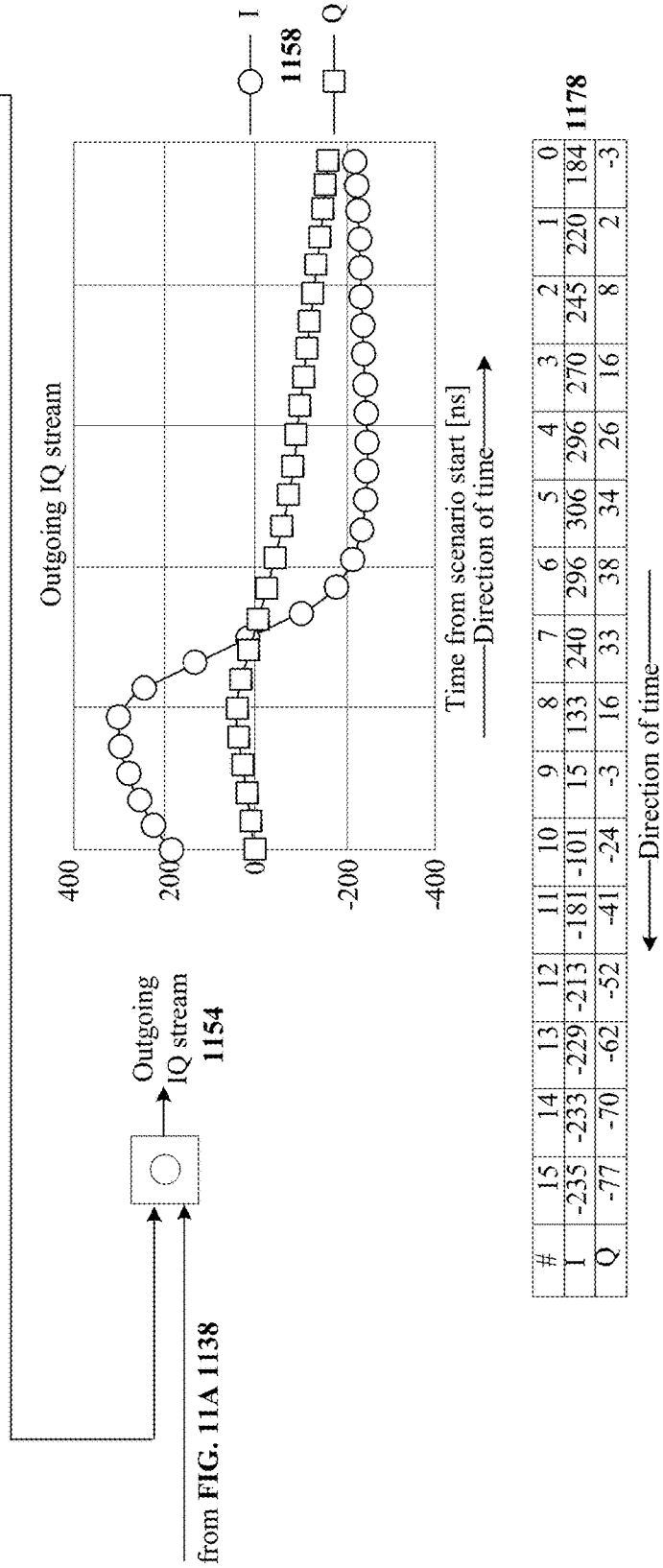

The combination of FIG. 11A and FIG. 11B illustrate an example of calculating the output IQ stream of a block based on example incoming IQ data and example values from the NCO.

FIG. 11A shows inputs of NCO, with an initial phase supplied once when the channel is started FIG. 11B lists a snippet of coefficients calculated using input fractional part, and shows the outgoing IQ stream, graphed as output signals I and Q.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Government agencies as well as other customers are often not at liberty to disclose the interference signals that they need to utilize for testing specific receiver types. Also, the IQ data files that customers want to utilize for simulating test conditions are not spatially aware. Noise signals, AM/FM, and other interference signals are describable using IQ data, to control interference to overlay into a test simulator.

The disclosed technology uses signal generation techniques to generate, in digital baseband, an IQ signal and the modulation associated with the signal merged into the baseband IQ signal to produce a modulated waveform that incorporates spatial awareness, pseudorange and motion before supplying the merged signals to the receiver during a test. The technology disclosed deconstructs an underlying signal and rebuilds the signal with spatial awareness, range and relative movement of a receiver and a transmitter under test, imparting information into an incoming IQ stream so that it appears representative of an incoming signal stream coming from a location instead of having no spatial awareness. The disclosed technology imposes transmitter location on an IQ signal not labeled with transmitter location and applies spatial awareness as the transmitter location and the incoming IQ signal change. For a test simulation, it appears that the conditioned IQ signal is generated inside the simulator, even though the IQ signal stream is provided by the customer, such as the government. The disclosed technology can also be utilized for test signals for systems such as NextNav, the developer of a 3D geolocation service called Metropolitan Beacon System, a wide area location and timing technology designed to provide services in areas where GPS or other satellite location signals cannot be reliably received; for Locata, a local positioning system that can either replace or augment GPS signals when they are blocked, jammed or unreliable; low earth systems (LEOs), e-Loran, and ultra-wideband (UWB) radio technology.

Acronyms

Acronyms used in this disclosure are identified the first time that they are used. These acronyms are terms of art, often used in standards documents. Except where the terms are used in a clear and distinctly different sense than they are used in the art, we adopt the meanings found in testing standards. For the reader's convenience, many of them are listed here:

| | |
|---|---|
| ADAS | Advanced Driver-Assistance System |
| Alt-BOC | Alternate Binary Offset Carrier GNSS signal |
| ASIC | Application-Specific Integrated Circuit |
| BOC | Binary Offset Carrier |
| BPSK | Binary Phase Shift Keying |
| CASM | Coherent Adaptive Sub-Carrier Modulation |
| DUT | Device Under Test |
| FPGA | Field Programmable Gate Array |
| GNSS | Global Navigation Satellite System—constellation of satellites transmitting signals with positioning and timing data from space to GNSS receivers |
| GPS | Global Positioning System |
| GTX | Ground Transmitter |
| LUT | Look Up Table |
| Msps | Mega-samples per second |
| MBOC | Multiplexed Binary Offset Carrier |
| NCO | Numerically Controlled Oscillator |
| PosAPP | Spirent's Simulation Generator Positioning Application |
| PNT | Positioning, Navigation and Timing |
| PRN | Pseudo Random Number |
| RF | Radio Frequency |
| SIR | Simulation Iteration Rate |
| SVN | Space Vehicle Number |
| TMBOC | Time-Multiplexed Binary Offset Carrier |
| ZCNT | Specify simulated start time |

Signals

Satellites are uniquely identified by a serial number called space vehicle number (SVN) which does not change during its lifetime. In addition, the operating satellites are numbered with a space vehicle identifier (SV ID) and pseudorandom noise number (PRN number) which uniquely identifies the ranging codes that a satellite uses. One satellite transmits multiple, different PRN sequences for different signals it is transmitting. For example, a GPS SV transmits on L1 the C/A, P and other codes which have different PRN sequences. Additional codes are transmitted on other frequencies (L2, L5) by the same GPS SV.

GPS operates in the IEEE "L" radio band. The GPS L1 signal is a spread spectrum signal, meaning that the signal has a center frequency of 1575.42 MHz, but the signal power is intentionally spread over a wide frequency range. The spectrum of frequencies that contain power from the GPS L1 signal is wider than 50 MHz, but a commercial L1 GPS receiver will limit received RF bandwidth to between 2 MHz and 10 MHz. GNSS signal generation is inherently parallel, with multiple satellite signal channels generated simultaneously for each of several signal services of each of several GNSS systems. For the ranging codes and navigation message to travel from the satellite to the receiver, they are modulated onto a carrier wave.

FIG. 1A illustrates background information for GPS L1 C/A signal structure, with a carrier signal 102 at 1575.42 MHz, a PRN code signal 112 with 1.23 M chips/second, Navigation data at 50 bps and shows a combined, spread spectrum output signal 152 containing carrier, PRN and navigation signal 142. For the combined output signal 152, each shift from +1 to −1, or from −1 to +1 causes a corresponding phase shift of 180 degrees in the carrier. First the Mod 2 sum (same as XOR) of the PRN and NAV data (both binary) is built and the output is combined with the carrier. The carrier is a complex sinusoid and the combined PRN/NAV is also complex, with I and Q components. The C/A code (with NAV) is purely the Q component. If only the C/A code is generated there is nothing on the I component. The P code (with NAV) would go to the I component. Other signals go on both components. Code and carrier are combined by a complex mix.

L1 GPS signal power is spread over a range of frequencies by modulating the carrier using binary phase shift keying (BPSK) modulation with a pseudo random number (PRN) sequence, combined with the navigation data the satellite intends to transmit. A PRN is a sequence of binary values that has statistical properties similar to a random number. A GPS L1 C/A PRN is a repeating sequence of 1023 data bits, called "chips". P code sequence is much longer 6,187,104,000,000 p-chips, repeating once per week.

GPS satellites are in orbits around the Earth. Because the satellites and possibly the receiver are moving, the relative motion between the satellite and the receiver changes the L1 carrier and PRN modulation frequencies by up to multiple kHz, due to the Doppler effect. The receiver must be capable of searching for and tracking the carrier and PRN over this frequency range.

The signal transmitted by a GPS SV on the L1 band consists of multiple components (ranging codes and navigation messages), each of which has a unique function: the freely available C/A (coarse acquisition), the encrypted P(Y) code(precise), the modernized military M-code and new L1 C signal (civil, for interoperability with Galileo and other GNSS systems. The C/A code is transmitted on the L1 frequency as a 1.23 MHz signal using a bi-phase shift keying (BPSK) modulation technique. The P(Y)-code is transmitted on both the L1 and L2 frequencies as a 10.23 MHz signal using the same BPSK modulation, however the P(Y)-code is in quadrature with the C/A code (meaning it is 90° out of phase). L1C uses Time-Multiplexed Binary Offset Carrier (TMBOC) modulation, also implemented in the GPU implementation.

FIG. 1B illustrates the relationship between the L1 carrier 102 and the code chips 162. The PRN signal is modulated on the carrier signal 102. The first pseudo-random code is called the C/A (Coarse Acquisition) code 134, a bi-phase modulated signal with a chip rate of 1.23 MHz, which modulates the L1 carrier 102. It repeats every 1023 bits and modulates at a 1.023 MHz rate. Each chip is about 977.5 ns (1/1.23 MHz) long. The C/A code is the basis for civilian GPS use.

The second pseudo-random code is called the P (Precise) code 166. It is a particular series of ones and zeroes generated at a rate of 10.23 million bits per second. It is carried on both L1 and L2 and it is very long. The P-code is a PRN sequence much longer than the C/A code, at $6.187104 \times 10^{12}$ chips (773,388 MByte). Even though the P-code chip rate (10.23 Mchips/s) is ten times that of the C/A code, it repeats only once per week, eliminating range ambiguity. The week-long P code transmitted by each satellite is a particular week of the 37-week-long 'master' P code and helps a GPS receiver distinguish one satellite's transmission from another.

FIG. 1B also depicts how the IQ data, that is generated by the technology disclosed, consisting of the in-phase component I(t) 116 and the quadrature component Q(t) 126 can be used to generate an RF signal via an RF upconverter. I(t) data is in-phase and Q(t) data is quadrature-phase data (90 degrees out of phase with I(t) data). The bottom right part of FIG. 1B shows how a received RF signal can be converted to an IQ stream via a local oscillator.

We describe an architecture for incorporating an IQ stream into a test signal used to test a receiver in motion next.

Architecture

Figure 2:
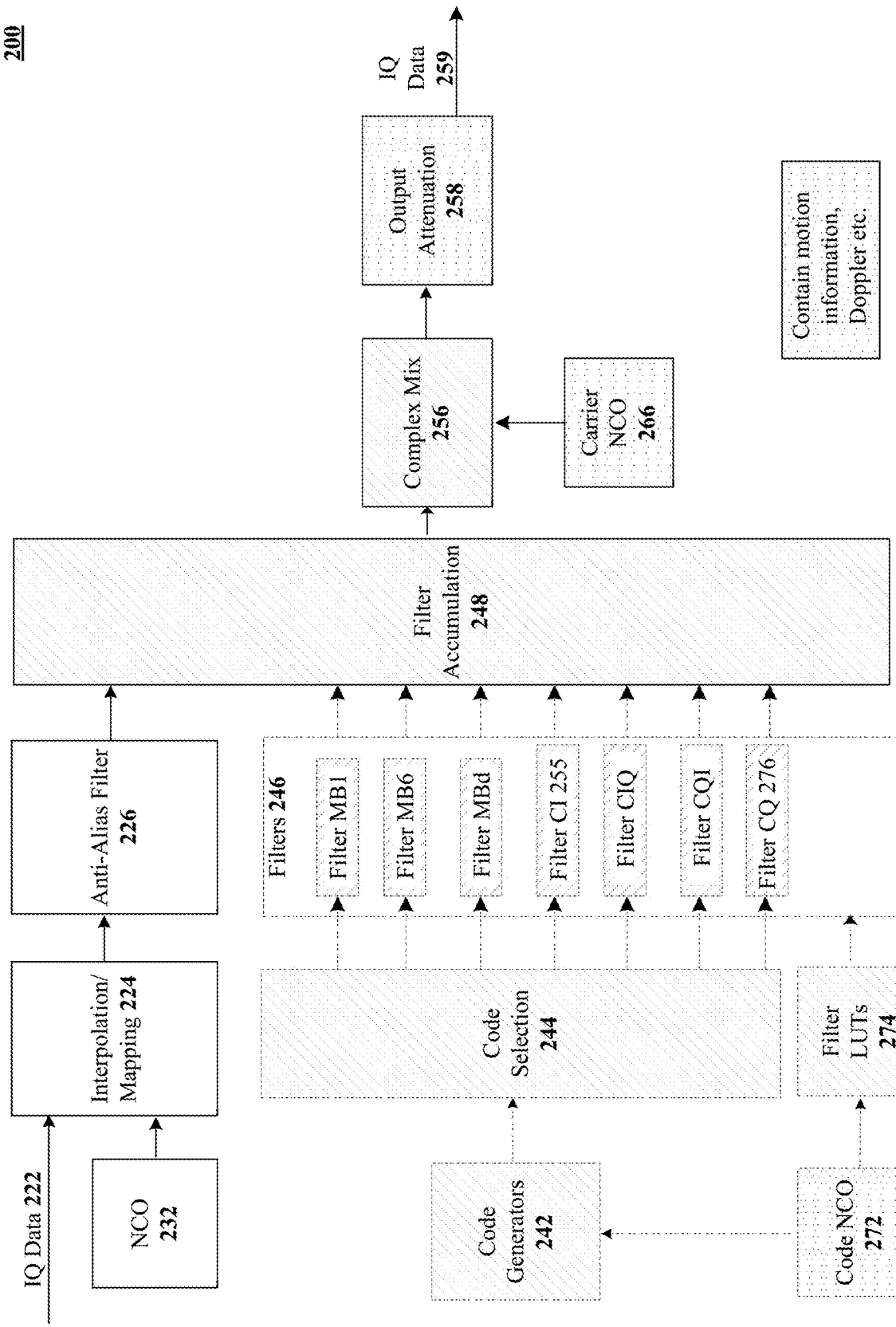
FIG. 2 illustrates architecture for incorporating an IQ stream into a test signal used to test a receiver in motion, according to one implementation of the technology disclosed.

FIG. 2 illustrates architecture 200 for incorporating an IQ stream into a test signal used to test a receiver in motion. The disclosed signal processing architecture incorporates range, range rate and level profiles, based on the relative motion between a transmitter (Tx) and a device under test (DUT), onto a user supplied IQ file and outputting IQ data 259 with these motion effects applied. Because FIG. 2 is an architectural diagram, certain details are intentionally omitted to improve clarity of the description. The discussion of FIG. 2 will be organized as follows. First, the elements of the figure will be described, followed by their interconnections. Then, the use of the elements in the system will be described in greater detail.

Architecture 200 includes IQ data 222, interpolation/mapping 224, anti-alias filter 226, NCO 232, filter accumulation 248, complex mix 256, output attenuation 258 and carrier NCO 266. Additional blocks, shown with dashed borders, are used for producing digital samples for generating encoded GNSS signals simulating a GNSS channel, using first principles.

Continuing the description of architecture 200, interpolation/mapping 224 accepts and processes IQ data 222. The interpolation stage is controlled by NCO 232 running nominally at the sample rate of the IQ input file. NCO 232 is rescaled from code NCO 272, applying code Doppler effects as described below. The initial phase of the NCO and the first sample to be taken from the input IQ stream is determined from the ZCNT supplied by PosApp, resulting in the correct delay effect being applied. Interpolation/mapping 224 selects the correct sample from the IQ input stream based on the state of NCO 232, or interpolates between two input samples if the NCO state is between samples. In one example, this is a linear interpolation between two samples, as higher order interpolations may make assumptions about the underlying signals represented by the input IQ file. Additional interpolation methods can be applied. After the interpolation some anti-alias filtering may be added. FIG. 11 shows an example, which is described in detail below.

Further continuing the description of architecture 200, anti-alias filter 226 removes potential aliasing resulting from the interpolation, as needed, and feeds the processed IQ signal into filter accumulation 248 to generate a single IQ complex number stream. Complex mix 256 takes in the carrier complex sinusoid generated by carrier NCO 266 and performs a complex mix with the IQ output from filter accumulation 248. As the signal path for the user supplied IQ data is running through the carrier NCO 266 and output attenuation 258, level and carrier Doppler effects are applied automatically. If a baseband IQ stream is generated, the frequency of carrier NCO 266 is the carrier Doppler frequency.

Architecture 200 is usable to generate an intermediate frequency (IF) stream such that a fraction of the carrier frequency plus carrier Doppler is present on the output IQ data 259, for example to combine multiple GNSS channels with similar but not equal carrier frequency, such as for GLONASS Frequency Division Multiple Access (FDMA), into one IQ stream that can go to a single file or single RF upconverter. Output attenuation 258 applies a gain to set the power level of the signal as seen by the receiver. Resultant IQ data 259 can be utilized in a simulation to test a receiver in motion, in one use case. The transmitter can be a ground transmitter (GTx) in one scenario, and can be a satellite transmitter, or airplane transmitter in other cases.

IQ data 222 can be a user-supplied file of input IQ signal data with accompanying start time information in one scenario. In another case, IQ data 222 can be an incoming IQ stream in real time. User-supplied IQ data can be signal data generated using communications channels such as Wi-Fi, 2G, 3G, 4G, 5G, GNSS, etc. The user-supplied file of IQ data 222 includes an IQ signal at baseband. In an alternative implementation, the carrier can be removed from an input IQ file of data, which is not at baseband, before processing (not shown). The processing supports a sample rate of at least 60 Msps, with a maximum supported sample rate below 120 Msps. The disclosed technology also supports much lower sample rates than 60 Msps, and can support rates above 120 Msps, in another implementation. In one example, the user-supplied file can specify how the transmitter is moving, via a car, drone, or space vehicle such as a satellite.

The disclosed technology applies motion effects to an incoming IQ stream with start time information. A first motion effect is a change in the power level due to path loss, also referred to as propagation loss, which is made up of free space path loss, atmospheric effects, and other losses such as solar effects, etc. Another motion effect is an initial delay resulting from the distance between GTx and the DUT and the amount of time the signal requires to 'travel' the distance. A third motion effect is the Doppler on baseband IQ data, carrier for data signal with separate Doppler and range rate resulting from the relative velocity between GTx and DUT. The Doppler on baseband IQ data effect also integrates the range rate into an incoming IQ stream. By modelling the Doppler correctly across times, the range rate is also represented correctly across times and by this the absolute range is represented accurately across times.

The disclosed technology can be utilized with controlled reception pattern antennas (CRPAs) which provide increased precision and robustness to positioning systems, protecting against jamming and spoofing attacks, in some implementations. A CRPA antenna consists of multiple antenna elements which are arranged with known special offsets. Due to these offsets, the incoming RF is slightly different at every antenna. From these differences the antenna can, for example, work out the angle of arrival of a certain signal. The disclosed technology applies the small differences at the incoming RF for each antenna element correctly. Therefore, the disclosed technology is suitable to test a CRPA antenna with an IQ stream transmitter.

The user can utilize Spirent's PosApp GUI to select a new 'IQ file' option as the GTx signal type, and can specify the path to the IQ file, the sample rate and the bit depth. This information gets passed via firmware for GPU generation. As this 'IQ file' signal type is running on a channel similar to other GTx signal types, PosApp provides the relevant level, ZCNT and NCO information which are usable for modeling the motion effects onto a user supplied IQ file. The disclosed functionality gets implemented as a new GTx signal type, extending the existing list of GTx signal types such as AM, PM, FM, etc.

Architecture 200 also includes blocks, shown with dashed borders, for producing digital samples for generating encoded GNSS signals simulating a single GNSS channel, using first principles. In this scenario, to simulate multiple channels, and multiple GNSS satellites, each GNSS channel is calculated separately (in parallel as the calculation of different GNSS channels/satellites is independent from each other) by architecture shown in FIG. 2. In a final step not illustrated in FIG. 2, the IQ output 259 of all channels on the same center frequency (for example all L1 channels) are summed up resulting in one IQ stream per center frequency, that can be transferred to corresponding RF upconverters to generate an RF signal or can be stored into a file. The architecture for a single GNSS channel 200 includes code generators 242, code selection 244, code numerically controlled oscillator (NCO) 272, filters 246 and filter accumulation 248. Using first principles, the generation of the IQ data 259 is done in several steps consecutively. The first step is to update parameters changing during the run of the simulation, that are the phase increments of Code NCO 272 and Carrier NCO 266 as well as the Output Attenuation 258. The phase increments are changing for example due to changes in the relative motion between satellite and antenna under test or atmospheric effects. The output attenuation is changing due to changes in the received signal power level resulting for example from a change of the attitude of the antenna or signal obscurations. The NCO and output attenuation updates are supplied by other software components of the simulation. Code NCO 272 is a numerically-controlled oscillator (NCO), creating a discrete-time, discrete-valued sawtooth signal serving as a clock for the code generators 242. The code NCO 272 is running typically at 10.23 MHz but can also be run at other frequencies depending on the required code rates and is corrected by Doppler and other effects. When the Code NCO is running at 10.23 MHz and P-code (which is running at 10.23 million chips per second) should be generated the P-code is advanced by one chip on every overflow of the Code NCO 272. If there is a positive Doppler effect because of the relative motion between satellite and antenna a slightly increased phase increment is provided for the Code NCO and it is running i.e., overflowing a bit faster and as the P-code is still advancing on every overflow also the advancing slightly faster. If, in addition to the P-code CA-code also needs to be generated the Code NCO 272 still needs to run at 10.23 MHz to provide the proper clock for the P-Code, but the CA-code needs to run at 1.23 million chips per second. To achieve that in this case the CA code generator is just advancing on every tenth overflow of the Code NCO. Code generators 242 are a set of different ranging code and navigation data generators like the CA-code generator and P-code generator. There are many more code generators than just the CA and P code generator in order to be able to generate the ranging codes and navigation data for every existing GNNS constellation. The way code generators 242 operate is based on algorithms in one example, and lookup tables (LUTs) in another case. LUTs are used for short sequences like the CA-code (1023 chips), but are not practical for long sequences as the P-code (6.187104×1012 chips) in which case algorithms are used. In some cases, the combination of multiple LUTs is also used, for example when there are primary and secondary codes. Code selection 244 combines the outputs from the code generators to the input streams of the pulse shaping filters 246, a many-to-many mapping, and is dependent on the simulated signal. In the GPS L1 case there are up to seven filters used, one for each input of the two modulators (4 CASM inputs and 3 TMBOC inputs). For example, the CA-code and the legacy navigation data are both going to the Q arm of the CASM modulator. Therefore, the code selection block is XORing the CA code and legacy NAV message and putting the result to the input of Filter CQ 276. The legacy navigation message is also forwarded to the Filter CI 255 input but XORed with the P-code.

Continuing the description of architecture 200, filters 246 generate the spread-spectrum, finite bandwidth signals from the binary input signals for generating realistic simulation of GPS signals generated by satellites. Filter accumulation 248 superimposes outputs from pulse shaping filters 246 according to the different modulations (CASM, MBOC, ALTBOC etc.) to generate a single IQ complex number stream. Complex mix 256 takes in the carrier complex sinusoid generated by the carrier NCO 266 and performs a complex mix with the IQ output from the filter accumulation 248. If a baseband IQ stream is generated, the frequency of the carrier NCO is the carrier Doppler frequency (i.e., if there is no Doppler effect present there is no carrier present on the output IQ data 259.

Given the starting position for a receiver—such as one in an autonomous vehicle or drone, the trajectory of the receiver, and the date and time—the simulator can calculate the GNSS signal seen by the receiver antenna where the motion is updated up to twice per millisecond, so 2000 times per second. In this simulation, a very accurate mathematical model of the motion of GPS satellites and the signals they send, including the effects of the earth's atmosphere are used to update the parameters of the disclosed signal generation process. In some cases, especially when the simulator is part of a closed loop simulation. The simulator does not know the trajectory in advance; the points of the trajectory are updated as they emerge, and can change every 500 μs. In one example of flying a drone, the controller can use the GPS simulator output to correct its trajectory, by controlling the thrusters on the drone. Physical effects affect the position, and the simulator calculates the GPS signals based on position. That is, position and GPS affect each other. Position updates are used to calculate GPS signals, as external inputs provided to the GPS simulator. That is, an emerging position is handled by the GPS simulator.

FIG. 3 through FIG. 8 illustrate an example scenario and the resulting effects modeled by the disclosed technology: pseudorange distance between receiver and transmitter as a function of time, Doppler shift over time, and signal level effects over time for the duration of the scenario, for conditioning an IQ stream to generate a test signal for testing a receiver in motion, in one example.

Figure 3:
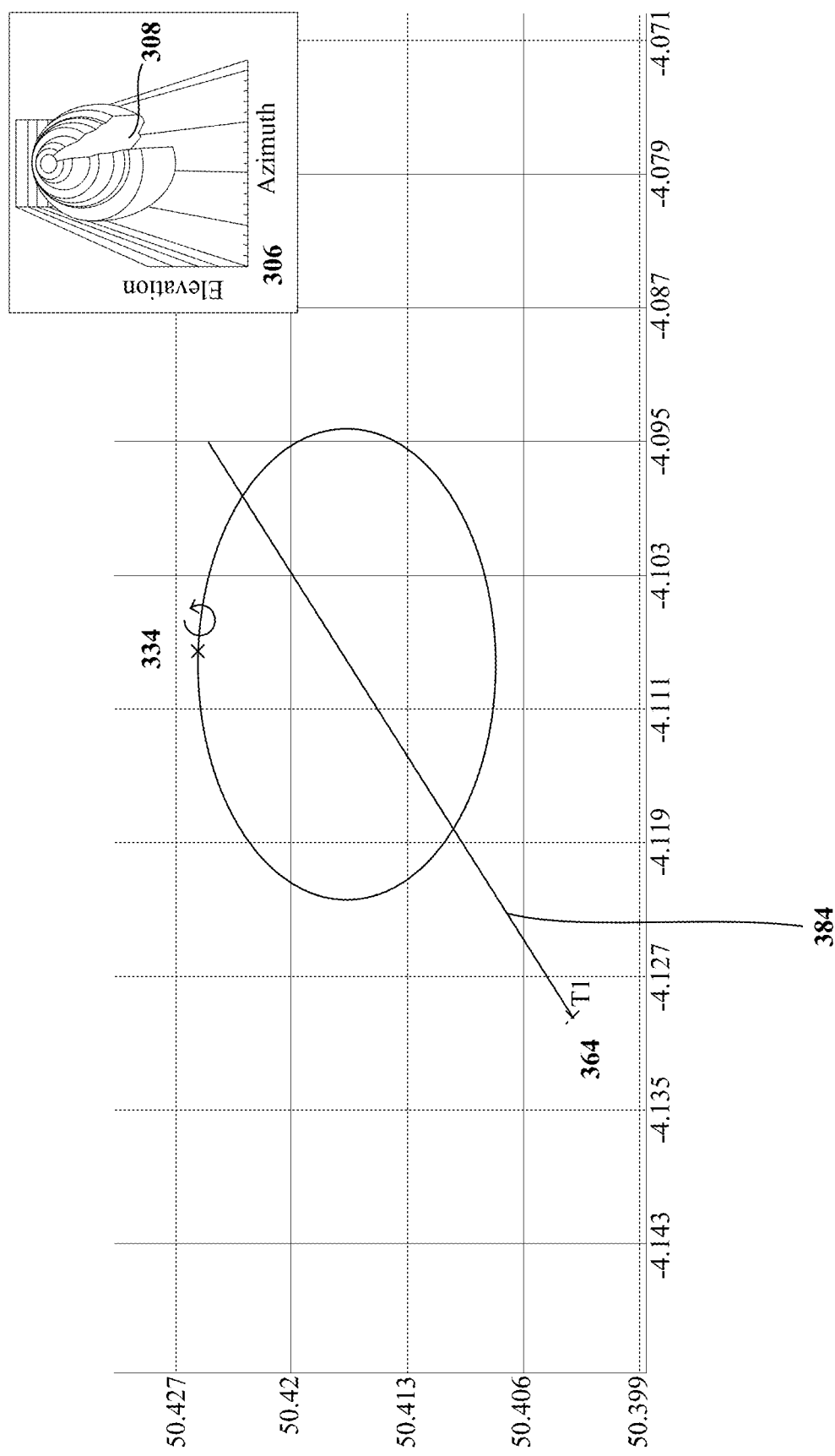
FIG. 3 illustrates an example IQ transmitter and a shadow area modelled for the transmitter, and displays paths for a transmitter and a receiver, which are both in motion.

FIG. 3 illustrates an example IQ transmitter 306 and a shadow area 308 modelled for the transmitter, displayed with azimuth x axis and elevation y axis. The model is usable to apply effects that occur due to signal transmission from transmitter to receiver, in one example. FIG. 3 also displays paths for transmitter 364 and receiver 334, which are both in motion. The positions/paths are absolute. The coordinate system shows degrees of latitude and longitude. The example trajectories are somewhere in the southwest of England, in this example. In FIG. 3, the path of receiver 334 is on the circle and the path of the transmitter 364 is along the straight line, and the transmitter moves across and then beyond the circular path of the receiver 384. The transmitter can alternatively be configured as different shapes, such as a sphere with uniform transmission. An operator configures the simulation using the positioning application (PosApp) user interface, and the disclosed technology is modeling the resulting level effect, range effect and Doppler effect.

Figure 4:
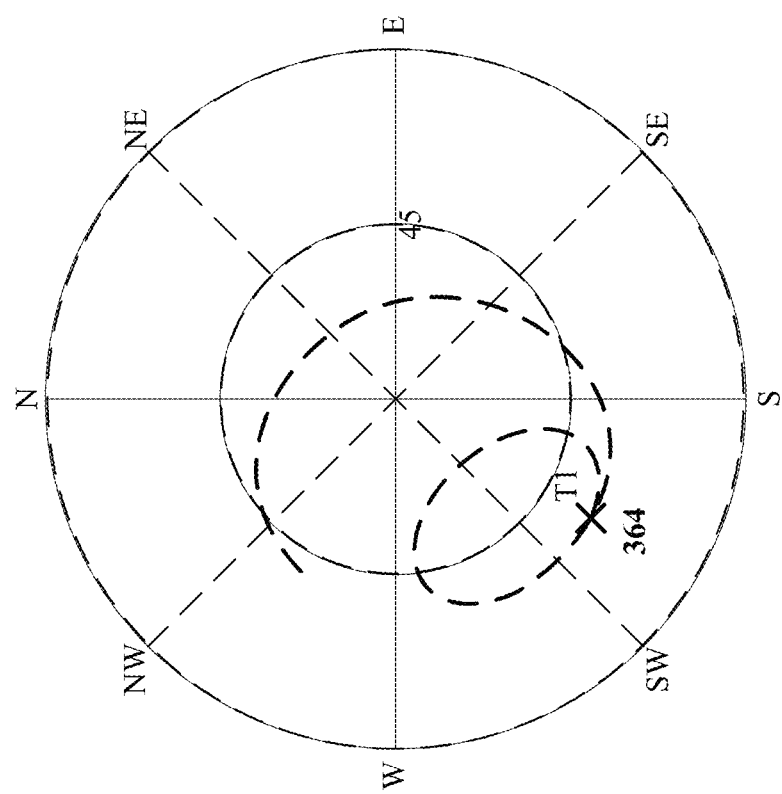
FIG. 4 illustrates a representation of the path of a transmitter as seen from the receiver location, for one example test simulation.

FIG. 4 illustrates a representation of the path of transmitter 364 as seen from the receiver location, for one example test simulation.

Figure 5:
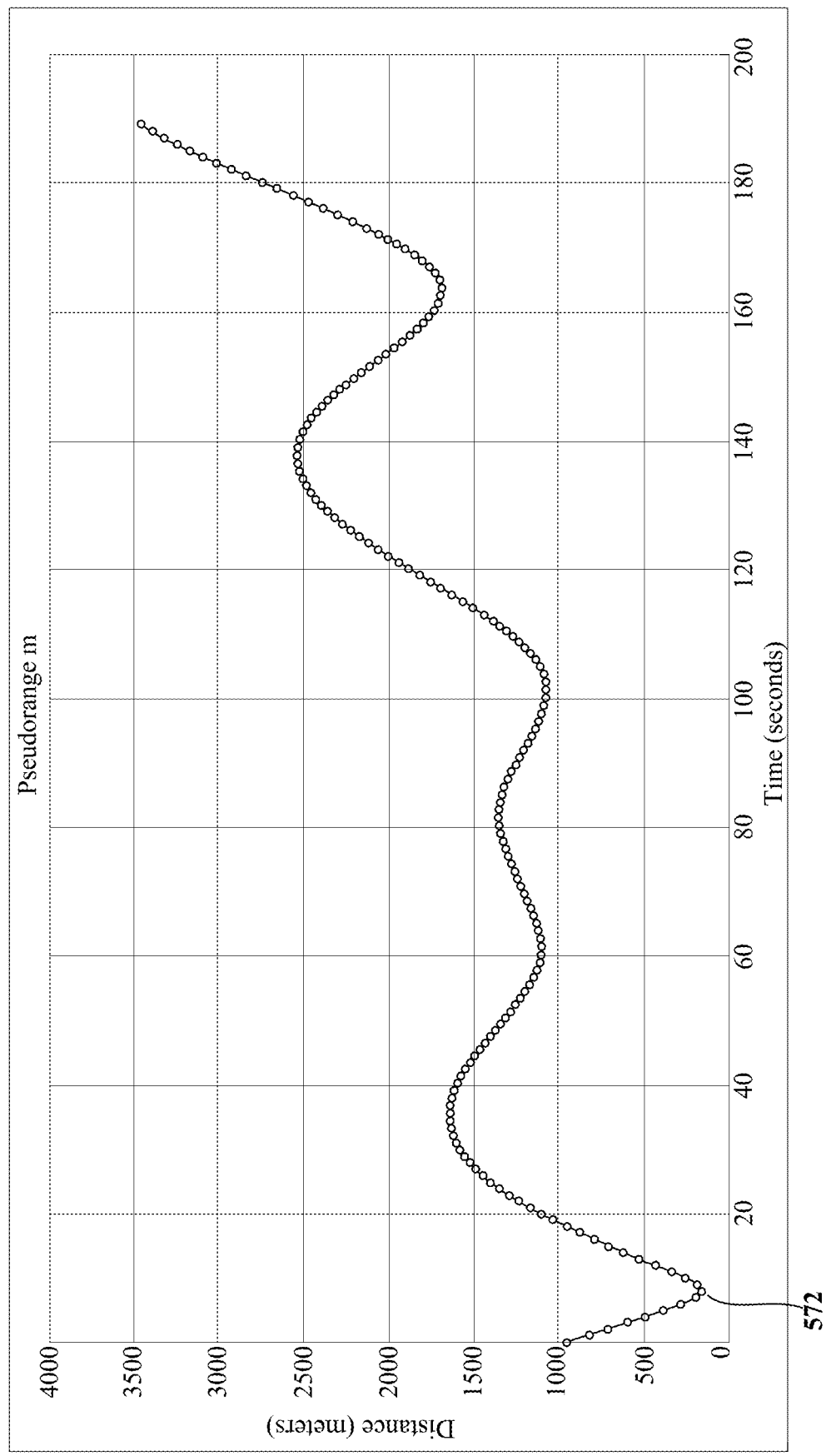
FIG. 5 shows the pseudorange distance between receiver and transmitter as a function of time in seconds.

FIG. 5 shows the pseudorange distance between receiver and transmitter as a function of time in seconds (x axis). Pseudorange takes into account atmospheric effects as measured from transmitter 364 at receiver 334. Each dot on the graph is equally spaced in time. In this example, the simulation includes 190 seconds and the pseudorange distance is graphed in a range of 0 to 4000 m. The pseudorange values are decreasing toward zero 572 when the receiver and transmitter are moving toward each other. The pseudorange value increases in distance as the receiver and transmitter move away from each other. FIG. 5 is showing this (corrected) range between receiver and transmitter over time as evaluated by the software. The range is evaluated once per simulation iteration rate, e.g., every 500 μs, in one implementation.

Figure 6:
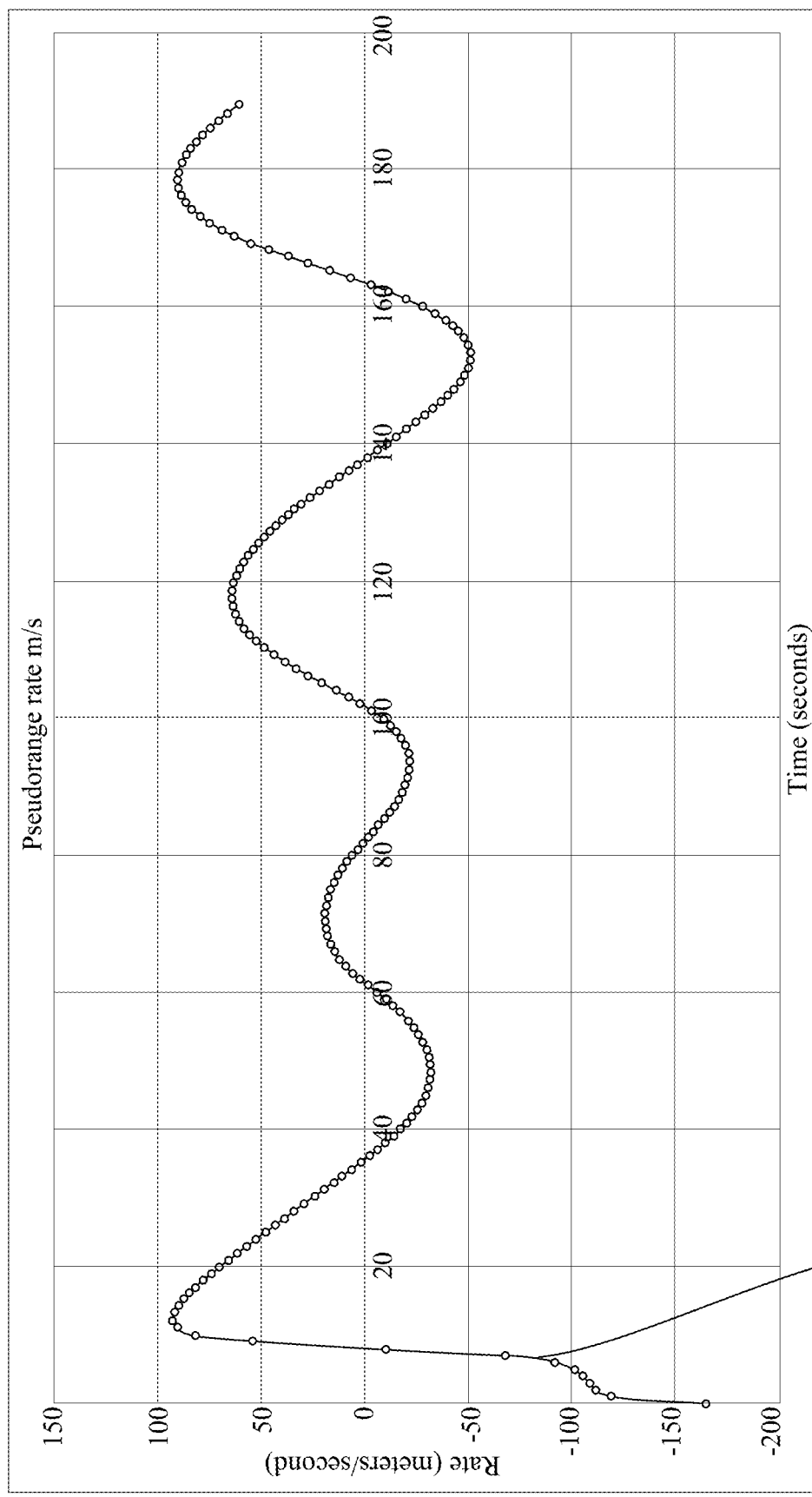
FIG. 6 illustrates the pseudorange rate of change in m/s, which shows how fast the pseudorange is changing over time.

FIG. 6 illustrates the pseudorange rate of change in m/s, which shows how fast the pseudorange is changing over time. Pseudorange rate is utilized for applying Doppler effect to IQ data. Values are positive when the distance between the transmitter and the receiver is increasing, and negative when the distance is decreasing. The x axis shows the simulation time in seconds and the y axis shows the pseudorange rate from −200 to +150 m/s. A negative pseudorange rate 672 occurs when the receiver and transmitter are moving toward each other, as shown by pseudorange values in FIG. 5 decreasing toward zero 572.

Figure 7:
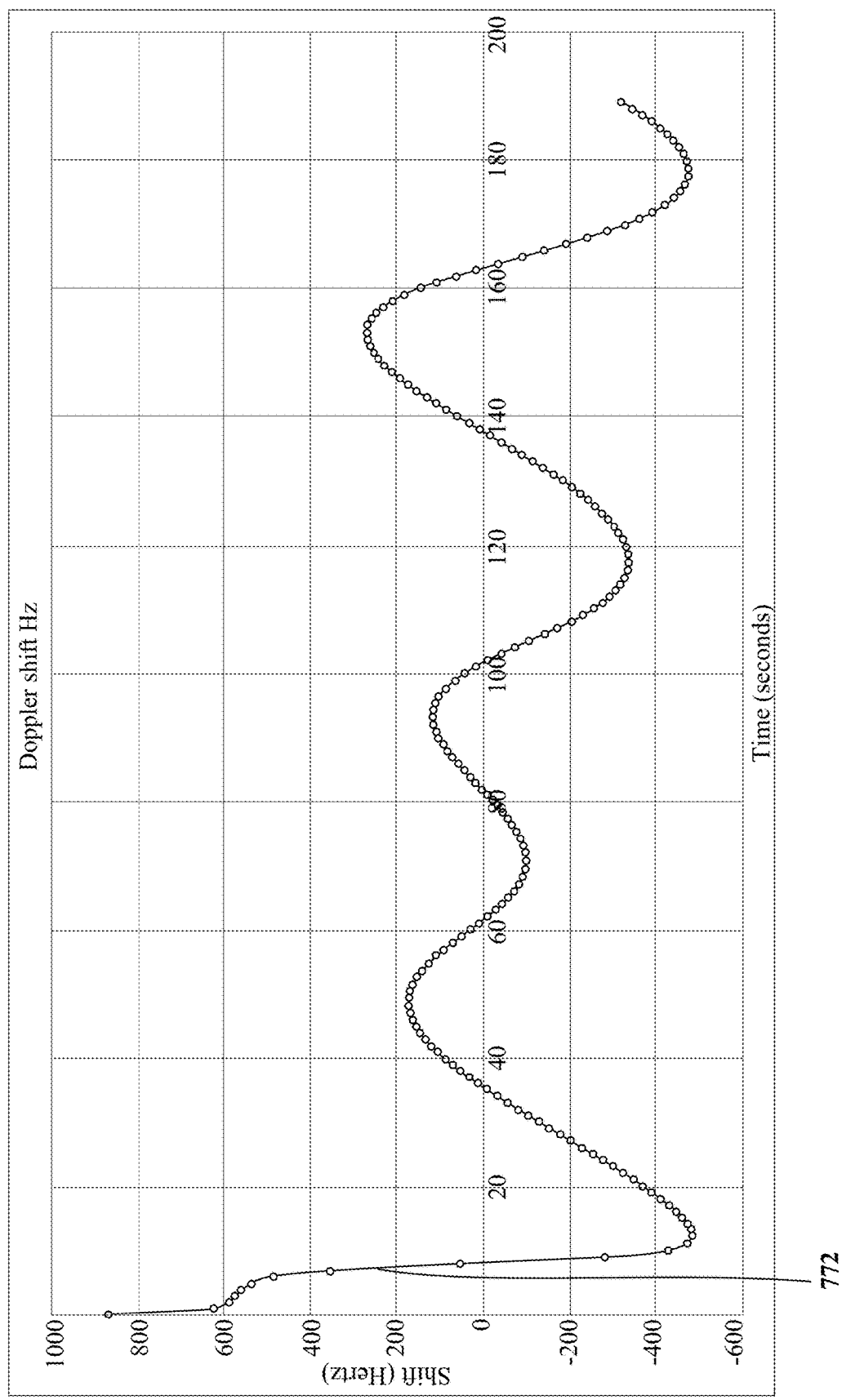
FIG. 7 illustrates the carrier Doppler shift (Hz) as a transmitter and a receiver are both in motion.

FIG. 7 illustrates the carrier Doppler shift (Hz) as transmitter 364 and receiver 334 are both in motion. The carrier Doppler shift is much higher than the Doppler shift for NCO 232 because the carrier frequency, in case of GPS L1 1.57542 GHz, is much higher than the nominal frequency of NCO 232, which is 30 MHz in the illustrated example. In general, the profile of the Doppler shift over time for NCO 232 is very similar to the carrier Doppler shift, scaled down to the lower nominal frequency f0. Some effects can result in the Doppler for NCO 232 not being precisely a scaled version of the carrier Doppler. The x axis shows the simulation time in seconds and the y axis shows the Doppler shift from −600 to +1000 Hz. A positive Doppler shift occurs when the receiver and transmitter are moving toward each other, and pseudorange rate 672 is negative and pseudorange values are decreasing toward zero 572, as described above. This is comparable to the effect we experience when an ambulance moves closer to us and the pitch appears to go up, and when the ambulance moves further away from μs, the pitch appears to go down. The waveform of FIG. 7 represents the carrier Doppler shift effect in Hz, as transmitter 364 and receiver 334 are both in motion.

Figure 8:
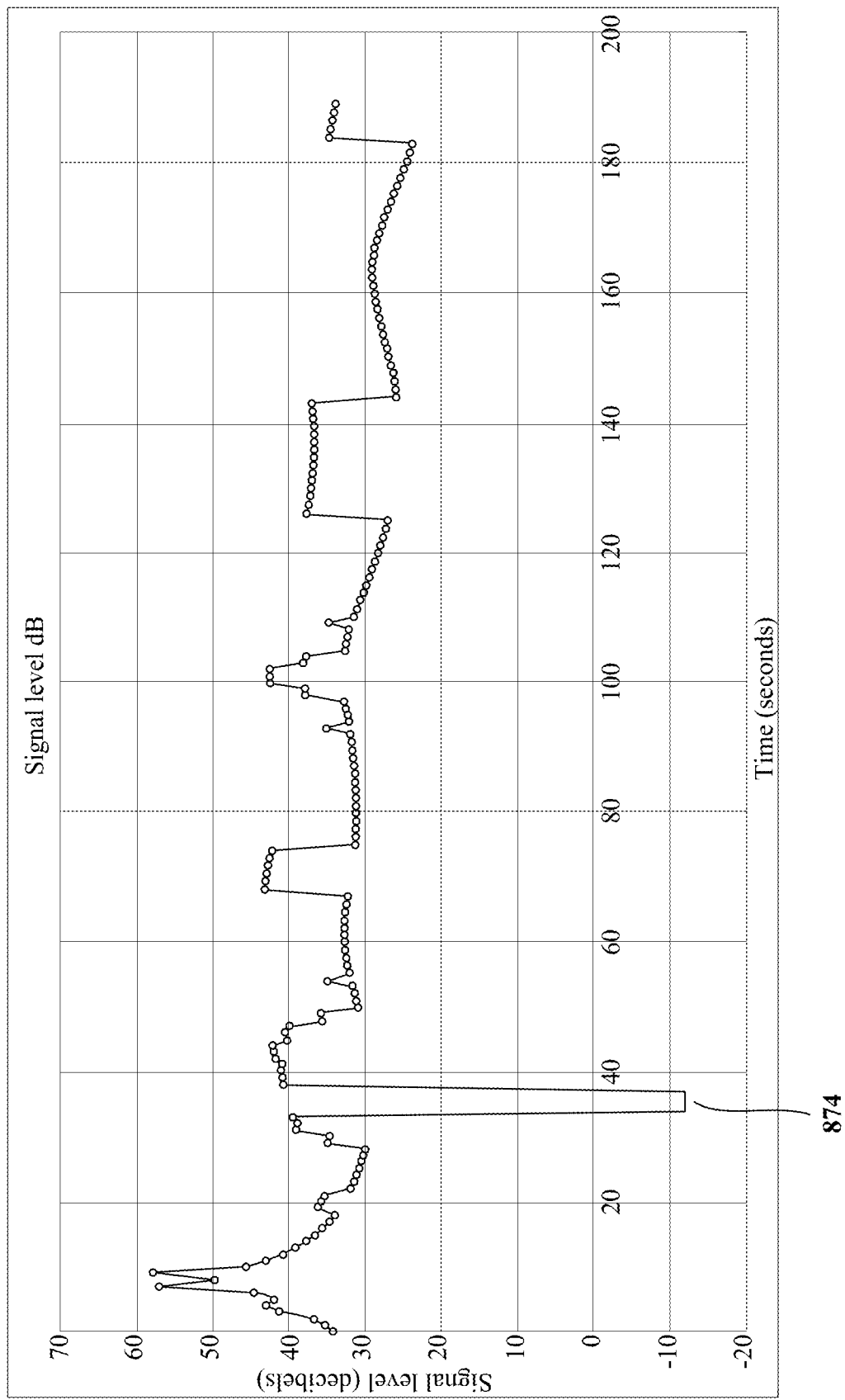
FIG. 8 illustrates disclosed level effects, with some modeled effects due to the distance between receiver and transmitter (signal strength).

FIG. 8 illustrates the level effect modeled via the disclosed technology. Some effects are due to the distance between receiver and transmitter (signal strength). In this example, the simulation results display 190 seconds and the signal level is graphed as −20 to +70 decibels (dB). Massive drop 874 represents the level effect during the time period that the receiver moves into the shadow area 308 modelled for the transmitter (shown in FIG. 3), due to the muting effect because the receiver is in the shadow area of the transmitter. After the transmitter moves beyond the path of the circling receiver 384, the signal strength level remains high. Peaks in signal strength occur when the transmitter and receiver are in relatively close proximity to each other. The range between transmitter and receiver, which is calculated once per simulation iteration rate, is also used to calculate the received signal level at every time step. The received signal level is composed of the user-defined transmit power, the free space path loss, which can be derived from the range, and other effects such as antenna patterns/gains, atmosphere, etc. which are also dependent on the relative position/range. This received signal level information is what is applied in the output attenuation block 258. FIG. 8 shows this signal level in decibels over time above a given reference level (130 dBm in that case) as it is calculated for the scenario shown in FIG. 3. FIG. 8 shows signal level per second, for values which are calculated once per simulation iteration rate, e.g., 500 μs.

Figure 9:
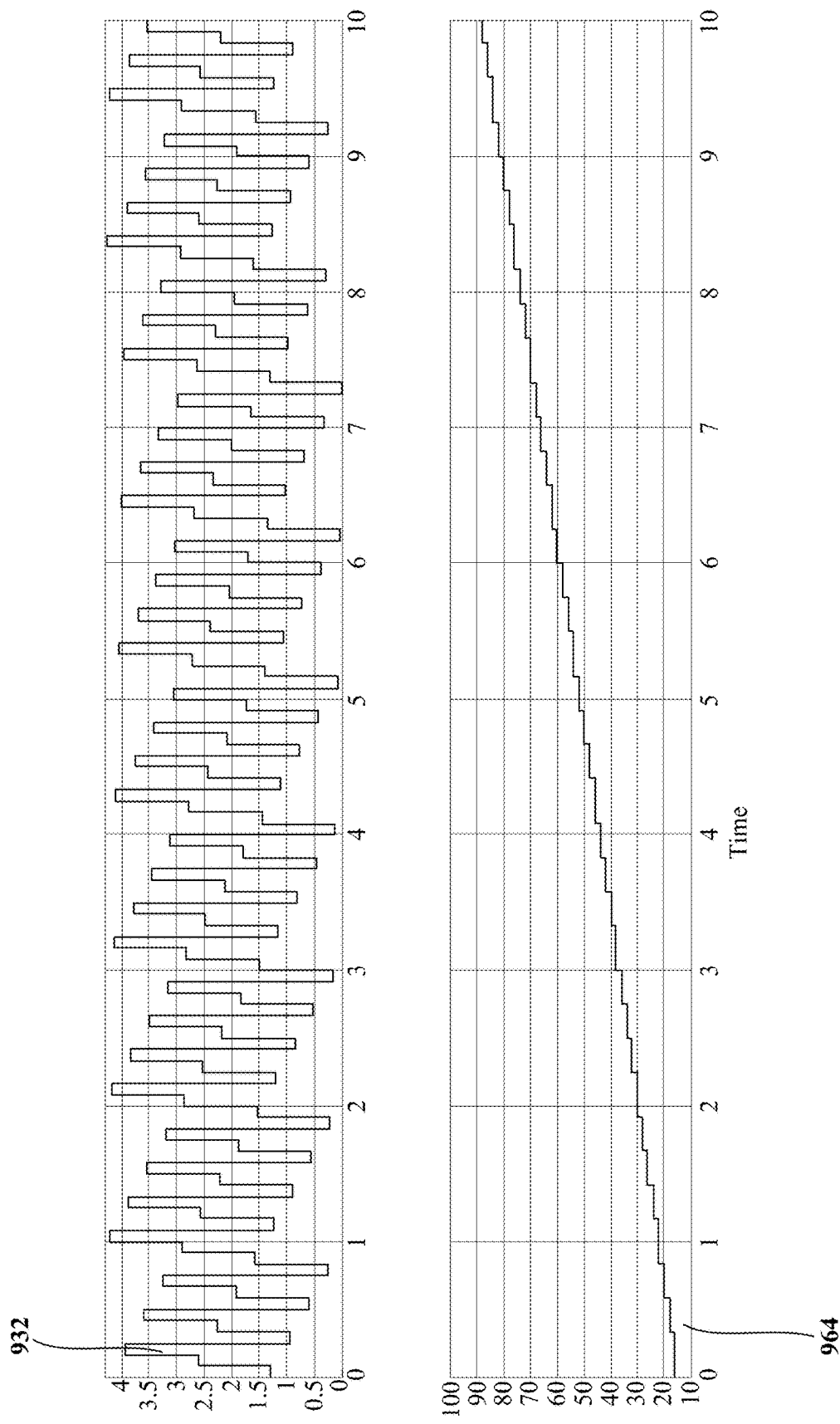
FIG. 9 illustrates the range and Doppler effect used to calculate the phase and NCO count values for NCO overflows.

FIG. 9 illustrates the initial range and Doppler effect used to calculate the phase and NCO count values for NCO 232. NCO 232 outputs values for phase and count of NCO overflows (how many times wrapped around). NCO 232 is configured to start with an initial phase (representing initial range), and frequency control word (representing nominal NCO frequency that matches the sample rate of the incoming IQ data stream plus the Doppler shift resulting from the initial range rate). The resolution of the NCO is 32 bits to represent the Doppler shift on the carrier phase, in one example. The time span of the plot shown in FIG. 9 is 0.1 microsecond. The NCO oscillates between zero and 232, representing the resolution of the 32 bit NCO, which stores the unsigned variable. At each time stamp, a phase increment is added 932. When the number exceeds the 32 bit capacity, the waveform wraps around and the count is updated. When the receiver and transmitter are getting closer together, each step is slightly higher at the NCO phase output. If the receiver and transmitter are moving away from each other, each step is slightly smaller. The count of NCO overflows 964 is monotonically increasing. The two NCO output values are sent to interpolation/mapping 224.

Figure 10:
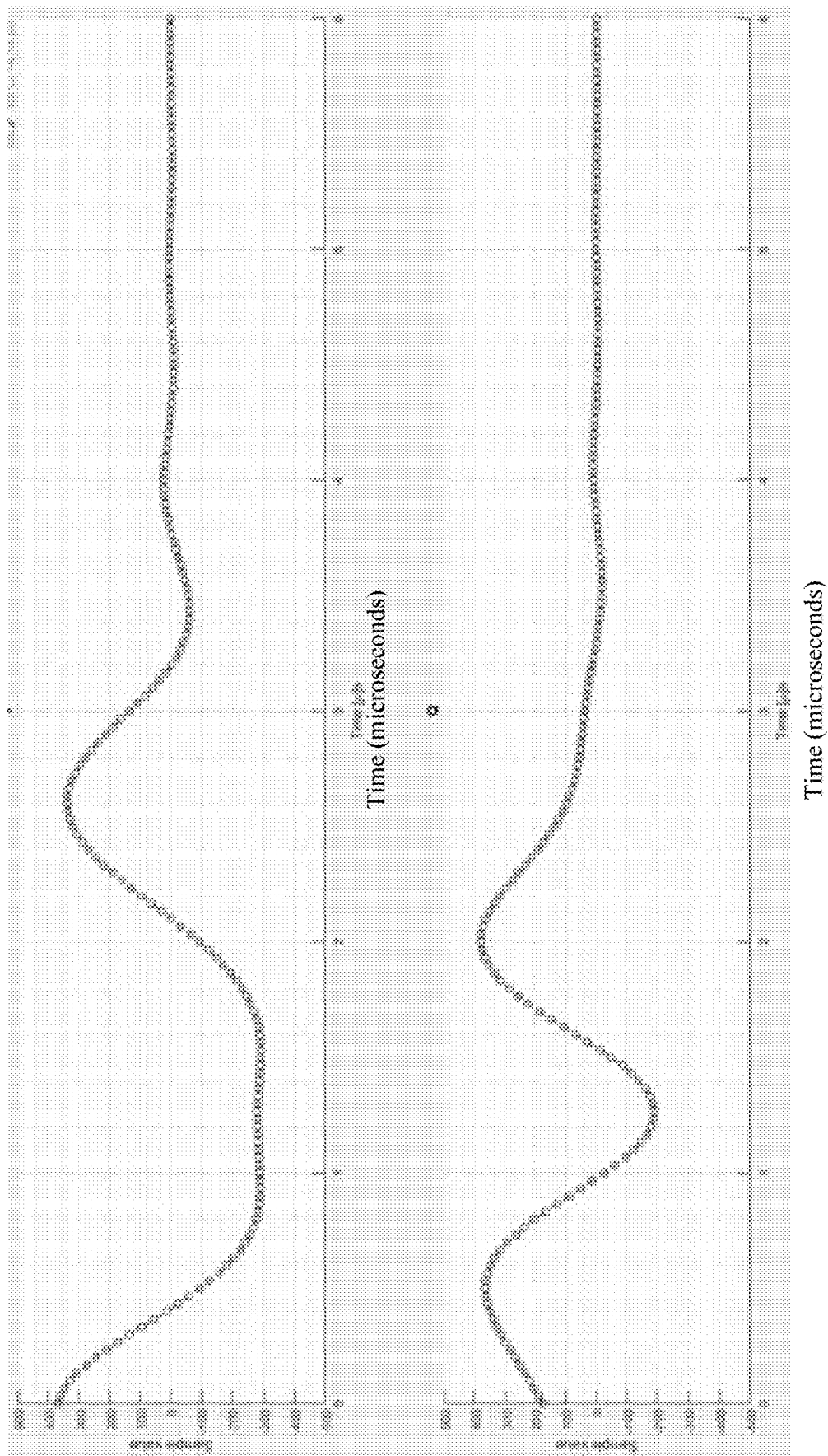
FIG. 10 illustrates incoming stream data for I and Q.

FIG. 10 illustrates example incoming stream data for I and Q. The sample values of I and of Q can range between −32,768 and −32,768 (16-bit quantization) dependent on quantization. The sample values of I and of Q are graphed per unit of time in microseconds, in this example. The emulated signal need not utilize the full bit depth. The disclosed technology also supports other bit depths. A higher bit depth allows the user to represent a higher range of amplitudes in the IQ file they supply.

The combination of FIG. 11A and FIG. 11B illustrate an example of calculating the output IQ stream of a block based on example incoming IQ data 222 and example values coming from the NCO block 232. The example values in this example are unrelated to example data in figures described above. NCO data is used to select a window of input IQ samples for every output sample. The size of this window is an implementation detail, with the example showing four samples. The disclosed technology works with various sizes for the window. The NCO data is also used to calculate a set of coefficients for every output sample. The number of coefficients in each set matches the input sample window size. I.e., the number of coefficients per set and the way they are calculated is an implementation detail and the disclosed technology works with multiple options.

FIG. 11A shows inputs of NCO 232, with an initial phase supplied once when the channel is started, representing the initial range between transmitter and receiver and a phase increment, updated once per simulation iteration rate, for example every 500 μs, representing the current range rate/Doppler. Incoming IQ stream 1104 shows the incoming IQ stream components I 1108 and Q 1118 as a function of time, with time increasing from left to right in the graph. Time point zero 1102 is 500 ns before the scenario start 1106. The receiver and transmitter position/trajectory are user input which is specified in the scenario definition. Table 1128 lists values of samples shown in 1104 from right to left as a function of time, illustrating the process in a "pipe/first in—first out" style. Note that in the disclosed GPU based implementation, samples are processed in parallel. In an FPGA based implementation, samples are processed in series, in a pipe-based first-in—first out ordering. During the scenario simulation the software is evaluating the range between receiver and transmitter once every simulation iteration rate, for example every 500 μs. This range is than corrected by atmospheric effects, etc. At the beginning of the simulation, the initial range between transmitter and receiver is used to calculate the initial phase of the NCO; see the first NCO data entering the interpolation stage 1142 at scenario start. The table of input int and input frac values for each input sample lists values with the scenario start sample 1146 in the rightmost column and time increasing from right to left. In the example, the initial range between transmitter and receiver is about 56.5 m, which means that the signal needs about 188 ns to travel between receiver and transmitter, which means that the RF received by the receiver at the start of the scenario has been generated about 188 ns earlier, as marked via dashed line 1114. The user also supplies a timestamp of the IQ data that is to be transmitted. In the example, the timestamp for the first incoming IQ sample is 500 ns earlier than the scenario start. Combining this with the information that the signal travels from transmitter to receiver about 188 ns at the start of the scenario means the RF seen by the receiver at scenario start is 312 ns into the user supplied file. In the example, the user supplied IQ data is sampled at 30 Msps; i.e., one sample is about 33.3 ns long. Therefore, 312 ns into the user supplied IQ file means 9.3542 samples into the supplied file, between sample 9 and 10 1126. The initial phase of the NCO, which is equivalent to the first NCO data supplied to the interpolation/mapping stage is 9 full samples (input int 1134, 964) and a fractional (scaled to 32 bits) of $0.3542*2^{32}=1,521,277,416$ (input frac 1144, 932).

After the scenario initialization the range between transmitter and receiver is evaluated and corrected by atmospheric effects etc. at every timestep based on the position/trajectory information supplied by the user. Comparing the newly calculated range value at every step with the one calculated in the previous timestep results in the change of the range between the steps. Dividing this change in the range by the time delta between the two steps results in the range rate, i.e., at what rate (velocity) the range between transmitter and receiver is changing.

Continuing the description of FIG. 11A and FIG. 11B, the nominal frequency of NCO 232 is equal to the sample rate of the incoming IQ data; i.e., in the example shown at 30 MHz. This frequency is corrected by the Doppler shift resulting from the relative velocity between transmitter and receiver (range rate). The Doppler shift can be directly calculated from the range rate: $\Delta f = \Delta v/c * f0$. $\Delta f$ is the Doppler shift, $\Delta v$ is the range rate (positive when moving towards each other), c is the speed of light and f0 is the emitted frequency (here the nominal NCO frequency/sample rate as we are still at baseband at this stage, the carrier Doppler is added at the carrier NCO (266)). The NCO frequency corrected by the Doppler shift is then $f0+\Delta f$. In the example shown in the slide the range rate at the beginning of the scenario is 36 m/s (moving towards each other), this results in a Doppler shift of 3.6 Hz and a corrected NCO frequency of 30,000,003.6 Hz. This Doppler corrected NCO frequency (f) is evaluated once per simulation rate and then converted to a phase increment for the NCO. This phase increment/frequency control word (FCW) can be calculated using the clock speed of the NCO/output sample rate (Fout, 120 Msps in the example) and the number of bits used for the accumulation (N, 32 in the example): $FCW=f/Fout*2^N$. In the example this results in FCW=1,073,741,953.

FIG. 11B lists a snippet of coefficients 1132 calculated using input fractional part 1152 as shown in the snippet of the output sample table 1158. For each output sample a set of coefficients is calculated. Each set contains n coefficients, n is equal to the size of the window 1136, i.e., four in one example. Each coefficient is a weight for one sample in the incoming IQ data to calculate the outgoing interpolated IQ sample. For each output sample the current FCW is added to the fractional part of the previous state of the NCO. If the new fractional part of the NCO (input frac, 932) is bigger than $2^{32}$ the fractional part is wrapping around and the integer part (input int, 964) is increased by one. Adding the FCW is resulting in a new state of the NCO for each output sample. For the first outgoing IQ sample, the NCO state is int=9, frac=1,521,277,416. Int=9 selects the window of samples. In this example the window size is 4. i.e., we select four samples: two to the right and two to the left. I.e., samples 8, 9, 10 and 11 of the incoming IQ stream (1112/1136). These four samples are used to calculate the interpolated IQ sample at 9.3542 samples into the incoming IQ stream (1114). The interpolation is done by weighting the four samples of the window and summing the weighted samples. This is equivalent to the dot product of the coefficients and the sample window. The coefficients are calculated based on the frac value of the NCO. The calculation is dependent on the chosen interpolation method. The results of the dot product of sample window 1112 and coefficients 1132 is outgoing IQ stream 1154. FIG. 11B shows the outgoing IQ stream 1154, graphed as output signals I and Q 1158, with the first data leaving the interpolation at the scenario start on the left side of the graph, and table snippet 1178 listing the first data leaving the interpolation stage at the scenario start in the far right column of the table. The plot of the outgoing IQ data contains more samples than stated in the table. The shorter table snippet is included to make the example more apparent without including huge tables.

Next, we describe particular implementations for incorporating an IQ stream into a test signal used to test a receiver in motion.

Some Particular Implementations

We describe some particular implementations and features usable for incorporating an IQ stream into a test signal used to test a receiver in motion next.

In one implementation, a disclosed method of incorporating an IQ stream into a test signal used to test a receiver in motion includes configuring the test: configuring a path for the motion of the receiver during simulation, configuring a period of the simulation that includes time corresponding to start time, configuring at least one transmitter constellation to emulate during the simulation, and configuring a location of or path for the motion of at least one IQ stream transmitter during the simulation. The disclosed method also includes generating signals emulating the transmitter constellation and conditioning the IQ stream to be merged with the signals emulating the transmitter constellation: using distance and relative motion between the receiver and the IQ stream transmitter to determine delay and Doppler frequency shift between the IQ stream transmitter and the receiver in motion, scheduling sampling of the IQ stream, including interpolation among samples of the IQ stream, taking into account the delay and the Doppler frequency shift, and synthesizing a conditioned IQ stream from the interpolation among the samples, further taking into account signal level of the conditioned IQ stream, in addition to the delay and the Doppler frequency shift. The method further includes merging the conditioned IQ stream with the signals emulating the transmitter constellation, and supplying the merged signals to the receiver during the test.

The disclosed technology for generating the RF wavefront represented by IQ data, as seen by a receiver based on a user supplied IQ file transmitted by a transmitter by adding motion effects etc., can also be implemented on a field programmable gate array (FPGA).

IQ emulation can be run by itself or combined, or may be useful for systems other than GNSS systems. In some implementations of the disclosed method, incorporating an IQ stream into a test signal used to test a receiver in motion includes configuring the test: configuring a path for the motion of the receiver during simulation, configuring a period of the simulation that includes time corresponding to start time, and configuring a location of or path for the motion of an IQ stream transmitter during the simulation, without an additional satellite transmitter constellation. The same approach can be used to emulate a satellite or new constellation of satellites, such as a regional satellite constellation, before the satellites are deployed.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

For most implementations of the disclosed method, the transmitter constellation is at least one constellation of GNSS or other positioning satellite transmitters. In some implementations, the transmitter constellation is a plurality of ground based transmitters of cellular signals. In other implementations, the transmitter constellation is a plurality of ground based transmitters of Wi-Fi signals.

For some implementations of the method, the disclosed IQ stream represents a jamming signal. In some cases, the IQ stream represents an interference signal.

Some implementations of the disclosed method further include a start time with the IQ stream.

For many implementations, the receiver is one of GNSS and GPS receiver.

Some implementations of the disclosed method further include a plurality of IQ stream transmitters with distances and relative motions corresponding to satellites.

A tangible non-transitory computer readable storage medium loaded with computer program instructions that, when executed on processors, cause the processors to become operable to implement the methods described above.

This system implementation and other systems disclosed optionally include one or more computing devices with processors, memory coupled to the processors and computer instructions from the non-transitory computer readable storage medium. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:

The invention claimed is:

1. A method of incorporating an IQ stream into a test signal used to test a receiver in motion, wherein the IQ stream represents an interference transmitter without representing the motion of the receiver in motion, the method including:
configuring the test, including:
configuring a path for the motion of the receiver during simulation;
configuring a period of the simulation that includes time corresponding to start time;
configuring at least one transmitter constellation to emulate during the simulation; and
configuring a location of or path for motion of at least one IQ stream transmitter of the IQ stream during the simulation;
generating signals emulating the transmitter constellation;
conditioning the IQ stream to be merged with the signals emulating the transmitter constellation, including:
using distance and relative motion between the receiver and the IQ stream transmitter to determine delay and Doppler frequency shift between the IQ stream transmitter and the receiver in motion;
scheduling sampling of the IQ stream, including interpolation among samples of the IQ stream, taking into account the delay and the Doppler frequency shift; and
synthesizing a conditioned IQ stream from the interpolation among the samples, further taking into account signal level of the conditioned IQ stream, in addition to the delay and the Doppler frequency shift;
merging the conditioned IQ stream with the signals emulating the transmitter constellation; and
supplying the merged signals to the receiver during the test.

2. The method of claim 1, wherein the transmitter constellation is at least one constellation of GNSS or other positioning satellite transmitters.

3. The method of claim 1, wherein the transmitter constellation is a plurality of ground based transmitters of cellular signals.

4. The method of claim 1, wherein the transmitter constellation is a plurality of ground based transmitters of Wi-Fi signals.

5. The method of claim 1, wherein the IQ stream represents a jamming signal.

6. The method of claim 1, wherein the IQ stream represents an interference signal.

7. The method of claim 1, further including a start time with the IQ stream.

8. The method of claim 1, further including a plurality of IQ stream transmitters with distances and relative motions corresponding to satellites.

9. A non-transitory computer readable storage medium loaded with program instructions that, when executed on processors, cause the processors to become operable to perform a method of incorporating an IQ stream into a test signal used to test a receiver in motion, wherein the IQ stream represents an interference transmitter without representing the motion of the receiver in motion, the method including:
configuring the test, including:
configuring a path for the motion of the receiver during simulation;

configuring a period of the simulation that includes time corresponding to start time;

configuring at least one transmitter constellation to emulate during the simulation; and configuring a location of or path for motion of at least one IQ stream transmitter of the IQ stream during the simulation;

generating signals emulating the transmitter constellation;

conditioning the IQ stream to be merged with the signals emulating the transmitter constellation, including:

using distance and relative motion between the receiver and the IQ stream transmitter to determine delay and Doppler frequency shift between the IQ stream transmitter and the receiver in motion;

scheduling sampling of the IQ stream, including interpolation among samples of the IQ stream, taking into account the delay and the Doppler frequency shift; and synthesizing a conditioned IQ stream from the interpolation among the samples, further taking into account signal level of the conditioned IQ stream, in addition to the delay and the Doppler frequency shift;

merging the conditioned IQ stream with the signals emulating the transmitter constellation; and supplying the merged signals to the receiver during the test.

10. The non-transitory computer readable storage medium of claim 9, wherein the transmitter constellation is at least one constellation of GNSS or other positioning satellite transmitters.

11. The non-transitory computer readable storage medium of claim 9, wherein the transmitter constellation is a plurality of ground based transmitters of cellular signals.

12. The non-transitory computer readable storage medium of claim 9, wherein the transmitter constellation is a plurality of ground based transmitters of Wi-Fi signals.

13. The non-transitory computer readable storage medium of claim 9, wherein the IQ stream represents a jamming signal.

14. The non-transitory computer readable storage medium of claim 9, wherein the IQ stream represents an interference signal.

15. The non-transitory computer readable storage medium of claim 9, further including a start time with the IQ stream.

16. The non-transitory computer readable storage medium of claim 9, further including a plurality of IQ stream transmitters with distances and relative motions corresponding to satellites.

17. A system comprising one or more computing devices with processors, memory coupled to the processors and program instructions from the non-transitory computer readable storage medium of claim 9 loaded into the memory.

18. The system of claim 17, wherein the transmitter constellation is at least one constellation of GNSS or other positioning satellite transmitters.

19. The system of claim 17, wherein the transmitter constellation is a plurality of ground based transmitters of cellular signals.

20. The system of claim 17, wherein the transmitter constellation is a plurality of ground based transmitters of Wi-Fi signals.

21. The system of claim 17, wherein the IQ stream represents one of a jamming signal and an interference signal.

22. The system of claim 17, further including a start time with the IQ stream.

23. The system of claim 17, further including a plurality of IQ stream transmitters with distances and relative motions corresponding to satellites.

* * * * *